(12) United States Patent
Jilani et al.

(10) Patent No.: US 11,764,387 B2
(45) Date of Patent: Sep. 19, 2023

(54) FUEL CELL STACK

(71) Applicants: AUDI AG, Ingolstadt (DE);
Volkswagen AG, Wolfsburg (DE)

(72) Inventors: Adel Jilani, Burnaby (CA); Siva Sankar Voosani Krishna, Burnaby (CA)

(73) Assignees: Audi AG, Ingolstadt (DE); Volkswagen AG, Wolfsburg (DE)

( * ) Notice: Subject to any disclaimer, the term of this patent is extended or adjusted under 35 U.S.C. 154(b) by 448 days.

(21) Appl. No.: 17/254,768

(22) PCT Filed: May 10, 2019

(86) PCT No.: PCT/EP2019/062015
§ 371 (c)(1),
(2) Date: Dec. 21, 2020

(87) PCT Pub. No.: WO2019/242933
PCT Pub. Date: Dec. 26, 2019

(65) Prior Publication Data
US 2021/0367258 A1 Nov. 25, 2021

(30) Foreign Application Priority Data
Jun. 22, 2018 (DE) ...................... 10 2018 210 170.1

(51) Int. Cl.
*H01M 8/248* (2016.01)
*H01M 8/1004* (2016.01)
*H01M 8/10* (2016.01)

(52) U.S. Cl.
CPC ......... *H01M 8/248* (2013.01); *H01M 8/1004* (2013.01); *H01M 2008/1095* (2013.01); *H01M 2250/20* (2013.01)

(58) Field of Classification Search
CPC ............... H01M 8/248; H01M 8/1004; H01M 2008/1095; H01M 2250/20; H01M 8/04; Y02E 60/50
See application file for complete search history.

(56) References Cited

U.S. PATENT DOCUMENTS 6,372,372 B1* 4/2002 D'Aleo ................. H01M 8/247
429/459
2007/0248855 A1* 10/2007 Reinert ................. H01M 8/248
429/495

(Continued)

FOREIGN PATENT DOCUMENTS

DE  10 2006 028 439 A1  12/2007
DE  10 2006 028 498 A1  12/2007

(Continued)

*Primary Examiner* — Muhammad S Siddiquee
(74) *Attorney, Agent, or Firm* — SEED INTELLECTUAL PROPERTY LAW GROUP LLP

(57) ABSTRACT

A fuel cell stack is provided comprising a first end plate and a second end plate between which a plurality of fuel cells is arranged. At least one elastic tensioning element is tensioned in a stack direction between the end plates. According to the invention, a section of the at least one tensioning element is arranged between a surface section of the fuel cell stack and a retensioning element, wherein a distance between the retensioning element and the surface section can be variably adjusted and set. In this way, the tensioning element can be stretched in a targeted manner by means of the retensioning element and as such the compressive tensile force acting on the fuel cell stack can be increased. A vehicle is also provided comprising such a fuel cell stack.

10 Claims, 3 Drawing Sheets

(56) References Cited

U.S. PATENT DOCUMENTS

| | | | | |
|---|---|---|---|---|
| 2008/0070068 A1* | 3/2008 | Fritz | ................ | H01M 8/04007 |
| | | | | 429/468 |
| 2008/0182152 A1* | 7/2008 | Erikstrup | .............. | H01M 8/248 |
| | | | | 429/495 |
| 2009/0029232 A1* | 1/2009 | Petty | .................... | H01M 8/248 |
| | | | | 29/592.1 |
| 2010/0062297 A1* | 3/2010 | Hafemeister | ......... | H01M 8/248 |
| | | | | 429/456 |
| 2011/0294030 A1* | 12/2011 | Yamamoto | ............ | H01M 8/247 |
| | | | | 429/465 |
| 2016/0006045 A1* | 1/2016 | Zillich | ................ | H01M 8/0271 |
| | | | | 429/434 |
| 2017/0288254 A1* | 10/2017 | Strahl | ................. | H01M 8/2404 |

FOREIGN PATENT DOCUMENTS

| | | |
|---|---|---|
| DE | 10 2010 007 979 A1 | 8/2011 |
| DE | 10 2012 000 266 A1 | 7/2013 |
| DE | 11 2014 001 941 T5 | 1/2016 |
| EP | 1 870 952 A2 | 12/2007 |
| EP | 2 280 442 A1 | 2/2011 |
| EP | 2 395 586 A1 | 12/2011 |
| WO | 2014/168330 A1 | 10/2014 |
| WO | 2017/131569 A1 | 8/2017 |

* cited by examiner

FUEL CELL STACK

BACKGROUND

Technical Field

The disclosure relates to fuel cells and vehicles comprising fuel cells.

Description of the Related Art

Fuel cells use the chemical conversion of a fuel with oxygen to water for the creation of electrical energy. For this purpose, fuel cells have a membrane electrode assembly (MEA) with a membrane electrode unit.

The membrane electrode unit is formed by a proton exchange membrane, PEM, upon which catalytic electrodes are arranged on both sides. In this manner, the membrane separates the anode chamber assigned to the anode and the cathode chamber assigned to the cathode from one another and electrically insulates the same. Gas diffusion layers can be arranged on the sides of the electrodes not facing the membrane.

During operation of the fuel cells, a hydrogen-containing fuel is supplied to the anode, upon which an electrochemical oxidation from $H_2$ to $H^+$ occurs with release of electrons. A water-bound or anhydrous transport of the $H^+$ protons from the anode chamber to the cathode chamber occurs via the electrolytic membrane. The electrons made available on the anode are supplied via an electrical line of the cathode.

The cathode is provided with an oxygen-containing operating medium, such that a reduction from $O_2$ to $O_2^-$ takes place there upon uptake of the electrons. These oxygen anions react in the cathode chamber with the protons transported through the membrane, with formation of water.

A fuel cell stack is generally formed by a plurality of MEAs which are arranged in a stack in a stack direction, the electrical power of which is added up. Bipolar plates, which ensure a supply of reactants and coolant to the individual MEAs, and which act as an electrically conductive contact with the membrane electrode assemblies, are generally arranged between the membrane electrode assemblies.

Seals are arranged between the membrane electrode units and the bipolar plates, so as to seal off the anode and cathode chambers from the outside and to prevent the outflow of the operating medium from the stack. These seals are provided on the membrane electrode units, the bipolar plates, or on both of these components.

For permanent sealing of the stack, and to ensure the electrical contact between the bipolar plates and the membrane electrode assemblies, the fuel cell stack is pressed prior to being put into operation. Furthermore, tensile elements are used to also press the fuel cell stack during operation.

Various tensioning elements are known from the state of the art. For example, two end plates arranged at the ends of the fuel cell stack can be connected by means of tensile elements. The fuel cell stack is pressed together through the introduction of tensile forces, via the tensile elements, to the end plates. Threaded rods, tension rods, chains, or the like can, for example, be used as tensile elements.

The use of stretched strips or band-shaped elastic tensioning elements, which are either connected with the end plates or at least partially run around a cross-section (in the stack direction), is also known. Reference is made, for example, to EP 1 870 952 A2 and DE 10 2012 000 266 A1, the content of which is referred to in its entirety here, as regards the design and attachment possibilities of such elastic tensioning elements (tensile elements).

It is possible, in particular in the active areas of the fuel cell stack or alternatively of the MEAS, that there are operationally related variations in height, which can, for example, vary with the temperature and moisture content of the fuel cell stack. It is also said that the stack breathes. In the case of elastic tensioning elements, it is possible that the elasticity of this tensioning element can decrease over time. In particular, in the case of metallic tensioning elements which run around the fuel cell stack in a ring shape and thereby have multiple obvious kinks, this leads to the elongation of the tensioning element, in particular in the area of these kinks.

No matter the variations in height of the fuel cell stack and the aging of the tensioning element, a sufficient compression of the stack must always be ensured, in particular to guarantee the sealing effect of the seals that are employed. Means, with which will be attempted to permanently ensure the compression of a fuel cell stack, are already known from the state of the art.

DE 10 2006 028 498 A1 discloses a tensioning device for a fuel cell stack with at least one tensile element for tensioning of the fuel cell stack and at least one elastic length elongation compensating element, which is integrated into a tensile element or joins two tensile elements with each other.

DE 10 2010 007 979 A1 discloses a fuel cell stack with fuel cells arranged between two end plates and at least one tensioning means, attached to the end plate, to exert tensile force. A friction-reducing means of deflection is arranged between the tensioning means and at least one of the end plates. A variation in height of the stack should be compensated by a compressed spring element arranged between one end plate and one compression plate.

According to this state of the art, tension spikes based on the expansion of the stack should be avoided by means of elastic elements. An initial over-tensioning of the elastic elements should even partially avoid a variation in height of the stack. The elastic elements are however themselves subject to aging and therefore these passive options for the adjustment of the compression force are, to this extent, disadvantageous.

In the case of solutions known from the state of the art, with compressed spring elements arranged between the end plates and other stack components, for example, compression plates, depressions able to accept the spring elements are generally provided in the end plates. The local weakening of the end plates corresponding to these depressions increases the tendency of the end plates to deflect under the action of compressive or tensile forces.

BRIEF SUMMARY

Embodiments of the invention are thus based on the task of overcoming the disadvantages of the state of the art and providing a solution for retensioning a fuel cell stack which can be integrated into existing fuel cell stacks without major adaptations, in particular, those with band or strip-shaped tensioning elements running around them.

This task is solved by a fuel cell stack with a first end plate and a second end plate and a plurality of fuel cells arranged in the stack direction between the two end plates. Furthermore, the fuel cell stack has at least one elastic tensioning element stretched between the end plates in the stack direction. At least one tensioning element is arranged, in sections, between a surface section of the fuel cell stack and a retensioning element.

A distance between the retensioning element and the surface section, such as a distance in the normal direction of the surface section, can be variably adjusted. The distance between a point of the retensioning element, such as a point which is least distant from the surface section in the normal direction, and the surface section may be variably adjustable by way of the at least one adjusting means or device. In addition, the retensioning element can be set (fixed) at a selected distance, such as a selected distance in the normal direction of the surface section, from the surface section. When the retensioning element is set or fixed, a displacement of the retensioning element by a force exerted by the tensioning element may be prevented.

The fuel cell stack thereby enables retensioning of the at least one tensioning element by reducing the fixed distance between the tensioning element and a surface section of the fuel cell stack, and thereby between the retensioning element and the tensioning element. Since the tensioning element is arranged between the surface section and the retensioning element, a reduction of the distance between the retensioning element and the surface section leads to contact between the retensioning element and the tensioning element from a certain point on.

If the retensioning element impinges on the tensioning element, it exerts a force on the tensioning element in the direction of the surface section. This causes an elongation of the tensioning element, which increases the compressive tensile force exerted by it on the fuel cell stack. The elastic tensioning element of the fuel cell stack may be tensioned in a range according to Hooke's law. Furthermore, the retensioning element allows the tensioning element to be re-tensioned in a stack direction (S) of the fuel cell stack and/or transversely to a stack direction (S) of the fuel cell stack. Furthermore, the stack compression can also be adjusted locally by manipulation of only one or some of the plurality of retensioning elements.

The said surface section can be arranged at different points of the fuel cell stack. If the at least one tensioning element is fixed to one side surface of the first and second end plate by means of tensioning devices, the surface section may then be located between the tensioning devices on one side surface of the fuel cell stack. Retensioning of the tensioning element by means of the at least one retensioning element may then be carried out in a direction transverse to the stack direction (S) of the fuel cell stack. If, on the other hand, the tensioning element is fixed on an outward-facing surface of a first and second end plate in the stack direction, then the surface section may be located on at least one of the outward-facing surfaces of the first or second end plate. If the surface section is located on at least one of the outward-facing surfaces of the first and/or second end plate, then a retensioning of the tensioning element may take place by means of the retensioning element in a direction parallel to the stack direction (S).

The tensioning element may be an elastic tensioning element known from the state of the art, which is fastened to the end plates of the fuel cell stack or substantially runs completely around the fuel cell stack (in other words in a ring-shaped manner) in at least one cross-section along the stack direction. In so doing, the tensioning element can, at least in sections, lie flat against a surface of the fuel cell stack, but is spaced away from the above-mentioned surface section, at least in the untensioned state. For example, the end plates protrude laterally beyond the fuel cells so that the tensioning element is at a distance from the side walls of the fuel cells. In this case, the surface section would be part of a side wall of the fuel cell stack. Alternatively, the surface section is part of one of the end plates of the stack. In this manner, the at least one tensioning element is arranged in sections between a surface section of one of the end plates and the retensioning element. Spacers can also be used in this case to create an initial distance between the tensioning element and the surface section of the end plate to provide space for retensioning.

The tensioning element may be designed as a band or strip-shaped flexible and/or elastic tensioning element, as is, for example, known from EP 1 870 952 A2. The tensioning element may consist of an elastic plastic, an elastic polymer (i.e., nylon) or an elastic metal, and under standard conditions has a modulus of elasticity >1 GPa, such as >5 GPa along the tensioning direction.

Furthermore, the tensioning element may be firmly bonded and/or fixed by means of at least one means of tensioning to at least one stack end plate. In order to ensure easy disassembly of the fuel cell stack, the tensioning element may be detachably fixed to at least one end plate of the stack. The tensioning element may be engaged into the end plate. For this purpose, the end plate may have at least one hook for engaging the tensioning element on one of its side faces or on its outwardly-facing surface in the direction of the stack. The tensioning element may have at least one engagement opening for engagement on an engaging hook.

Alternatively, the at least one tensioning element stretches, at least substantially, around a circumference of the fuel cell stack in a cross-section in the stack direction. In this case, a tensioning element is fixed at least at one of its end areas to another end area of the same tensioning element or to another tensioning element. The tensioning element can thus be designed to be closed in a ring shape.

The end area of the at least one tensioning element may be connected positively to another end area of the same tensioning element, for example, by a crimp connection. One end area of the at least one tensioning element may be fixed to another end area of the same or another tensioning element by means of a fastening device. An end section of the at least one tensioning element may be welded to another end section of the same or another tensioning element.

The fuel cell stack may have a plurality of tensioning elements which are stretched between the end plates in the stack direction or which run around the fuel cell stack in a ring shape. One or more, such as all, of the tensioning elements are arranged between a surface section of the fuel cell stack and a corresponding retensioning element. The fuel cell stack may have a retensioning element for each tensioning element.

In some embodiments, the retensioning element has at least one tensioning body connected to the surface section via at least one adjusting element. Furthermore, the at least one adjusting element may be designed to set (fix) the tensioning body at a variable distance from the surface section. The setting or fixing of the adjusting element may prevent a further unintentional displacement of the tensioning body by a force exerted by the adjusting or tensioning element. In other words, the at least one adjusting element is designed to variably adjust a distance between the tensioning body and the surface section.

The tensioning body of the retensioning element may be adapted to the shape and material of the tensioning element. When using band or strip-shaped tensioning elements, the tensioning body may have a width that exceeds the width of the tensioning element. The areas of the tensioning body that project beyond the tensioning element may then be in engagement with the adjustment elements. Only the tensioning body has an effect on the tensioning element, whereby the adjusting elements are not in contact with, or able to damage, the tensioning element.

The tensioning body may have a carrier plate connected to the at least one adjusting element, in particular a carrier plate extending over a large area, and at least one elevation projecting from the carrier plate in the direction of the tensioning element. During retensioning, only or at least primarily, the elevation of the carrier plate comes in contact with the tensioning device. If the carrier plate is displaced by an adjusting device acting on its edge area, a force is therefore only or primarily exerted on the tensioning device by the elevation. The elevation may be shaped in such a way that this force is exerted on the tensioning element as evenly as possible. For example, the width of the elevation is adapted to the width of the tensioning element or even identical to it. Furthermore, the elevation may have at least one rounded flank in the stack direction and is, for example, designed as a semi-cylindrical-shaped elevation.

The at least one adjusting element may have an external thread engaging in a threaded hole in the surface section. The distance between the retensioning element and the surface section can thus be changed by manual or automatic rotation of the at least one adjusting element. A fine thread may be used in order to enable the distance to be adjusted as precisely as possible. The adjustment elements may consist of a plurality of threaded bolts which pass through an area of the carrier plate that extends over the tensioning element and engage in corresponding threaded holes in the surface section. The rotational movement of the threaded bolts may be achieved by tool engagement. The threaded bolt may also be magnetically rotatable.

In another embodiment of the fuel cell stack, at least one adjustment element is designed to be retractable into the tensioning body. In other words, in a first configuration, the adjustment element protrudes at least in sections from the tensioning body and, in a second configuration, is recessed further into the tensioning body than in the first configuration. The at least one adjusting element is firmly connected to the surface section so that the distance between the adjusting element and the surface section is reduced by retracting the adjusting element into the adjusting body. The at least one adjustment element may be a bolt that can be moved into the tensioning body by means of microactuators. The at least one adjusting element can be retracted pneumatically or hydraulically into the tensioning body.

Alternatively, or additionally, the at least one adjustment element is designed to be contractible. For example, the adjustment element is designed as a scissor drive or has a scissor drive. The adjustment element may be designed as being hollow and may be contractible by the outlet of a fluid. At least one adjustment element can be controlled remotely. The variable adjustment of a fixed distance between the tensioning body and the surface section is thus carried out by remote control, for example, by radio remote control.

The surface section of the fuel cell stack, in particular, the surface section of the end plate, may have at least one recess. This recess may be designed to at least partially accommodate the retensioning element when reducing the distance between the retensioning element and the fuel cell stack. The at least one recess may be designed to accommodate the at least one elevation, as described above. In particular, a depth of the recess in the normal direction of the surface section corresponds at least to the height of the elevation. The at least one recess may also be located in one of the end plates.

The embodiment described here above enables that the at least one tensioning element lies flat against the surfaces of the fuel cell stack in a first configuration and stretches over the recess. In a second configuration, the distance between the retensioning element and the surface section is reduced so that the tensioning element is pressed into the recess by the retensioning element. In this manner, the tensioning device only lies flat and level on the surface in sections and is stretched (elongated/lengthened) in the area of the recess by the retensioning element against the normal direction of the surface. By lengthening the tensioning device, the compressive tensile force exerted by it increases, like with a spring.

The retensioning element may be already partially recessed in the recess during initial tensioning of the tensioning device. By increasing the distance between the tensioning body and the surface section and removal (lifting) of the tensioning body from the recess, it is thus possible to reduce the compressive force, e.g., to compensate for an operationally-related increase in stack height. The use of a recess also makes it possible to dispense with spacers to create a distance between the tensioning element and the fuel cell stack.

In some embodiments, a means of deflection is arranged in at least one edge area of the fuel cell stack tensioned by the at least one tensioning element. A means of deflection may be arranged in at least one edge area of the first end plate and/or the second end plate tensioned by the at least one tensioning element. The means of deflection is designed, in particular, to reduce friction between the tensioning element and the edge area. This friction reduction enables the stack tension to be repeatedly and finely adjusted by means of the variably fixable distance between the retensioning element and the stack.

The means of deflection may be a surface with low sliding friction, for example, by means of a suitable coating. The means of deflection may also be a deflection pulley. The means of deflection may be arranged in at least one of the end plates. For further details on the design of the means of deflection, full reference is hereby made to DE 10 2010 007 979 A1.

In another embodiment of the fuel cell stack, at least one of the first end plates and second end plates is segmented. At least one tensioning element with a retensioning element may pass over each of these segments. The decoupling of the individual tensioning elements by segmentation of the end plates allows a local variation of the stack compression.

A further subject matter is a vehicle, in particular an electric-motor-driven vehicle with a fuel cell stack as described above. The fuel cell stack serves in particular to supply an electric motor of the vehicle.

The various embodiments described herein can be combined with each other, unless otherwise specified in the individual case.

BRIEF DESCRIPTION OF THE SEVERAL
VIEWS OF THE DRAWINGS

Embodiments of the invention will be further explained with reference to the drawings.

DETAILED DESCRIPTION

Figure 1:
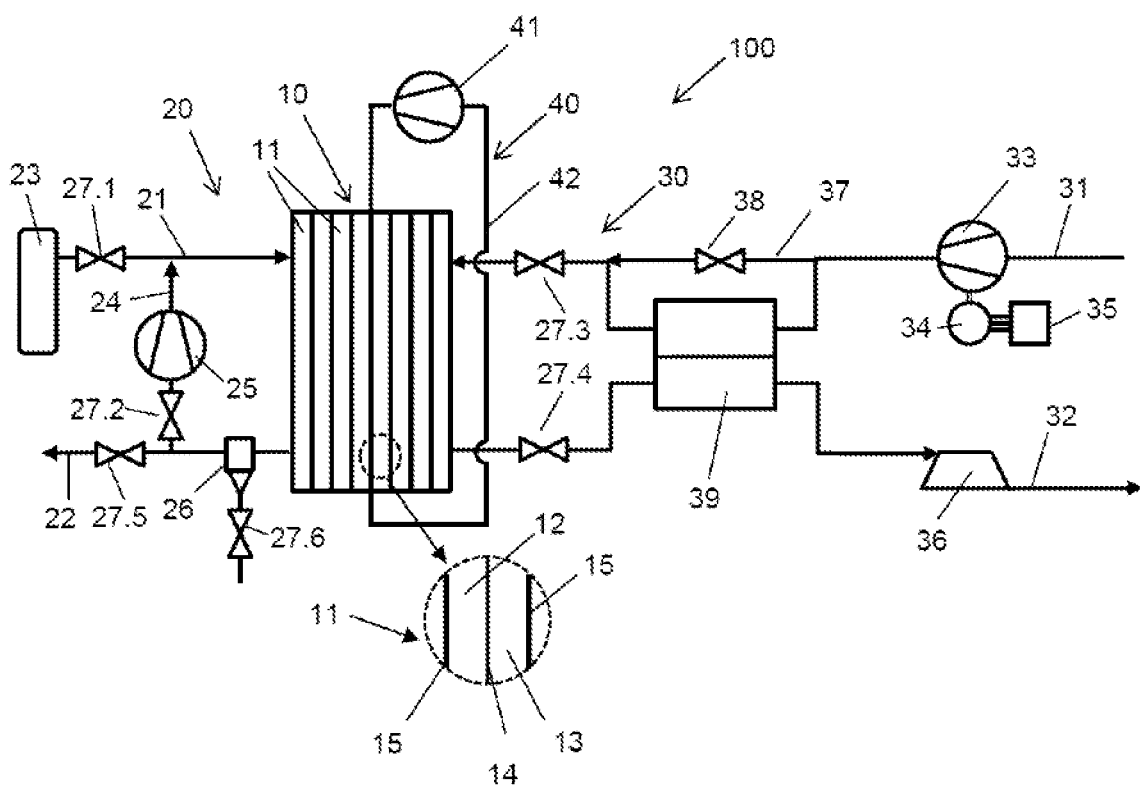
FIG. 1 shows a schematic representation of a fuel cell system.

FIG. 1 shows a state-of-the-art fuel cell system designated 100. The fuel cell system 100 is part of a vehicle that is not further represented, in particular, an electric vehicle, which has an electric traction motor that is supplied with electrical energy by the fuel cell system 100.

The fuel cell system 100 comprises, as the core component, a fuel cell stack 10, which has a plurality of individual cells 11 arranged in stack form, which are formed by alternately stacked membrane electrode assemblies (MEA) 14 and bipolar plates 15 (see detailed section). Each individual cell 11 thus comprises a MEA 14 with an ion-conductive polymer electrolyte membrane (not shown in detail here) as well as catalytic electrodes arranged on both sides thereof. These electrodes catalyze the respective partial reaction of the conversion of the fuel. The anode and cathode electrodes are designed as a coating on the membrane and have a catalytic material, for example, platinum, which is supported on an electrically conductive carrier material with a large specific surface area, for example, a carbon-based material.

As shown in the detailed illustration in FIG. 1, an anode chamber 12 is formed between a bipolar plate 15 and the anode, and the cathode chamber 13 is formed between the cathode and the next bipolar plate 15. The bipolar plates 15 are used to feed the operating fluids into the anode and cathode chambers 12, 13 and moreover establish the electrical connection between the individual fuel cells 11. Optionally, gas diffusion layers can be arranged between the membrane electrode assemblies 14 and the bipolar plates 15.

In order to supply the fuel cell stack 10 with operating resources, the fuel cell system 100 has an anode supply 20 on the one side and a cathode supply 30 on the other side.

The anode supply 20 of the fuel cell system 100 shown in FIG. 1 comprises an anode supply path 21, which serves to supply an anode operating resource (the fuel), for example, hydrogen, to the anode chambers 12 of the fuel cell stack 10. For this purpose, the anode supply path 21 connects a fuel storage 23 with an anode inlet of the fuel cell stack 10. The setting of the feed pressure of the anode operating resource into the anode chambers 12 of the fuel cell stack 10 is carried out via a metering valve 27.1. The anode supply 20 further comprises an anode off-gas path 22, which discharges the anode off-gas from the anode chambers 12 via an anode outlet of the fuel cell stack 10.

In addition, the anode supply 20 of the fuel cell system 100 shown in FIG. 1 has a recirculation line 24 which connects the anode off-gas path 22 with the anode supply path 21. Recirculation of fuel is common in order to return the fuel that was used overstiochiometrically to the fuel cell stack 10. A recirculation enhancement system 25, such as a recirculation blower, as well as a flap valve 27.2 may be arranged in the recirculation line 24.

In addition, a water separator 26 is built into the anode supply 22 of the fuel cell system to remove the product water resulting from the fuel cell reaction. A drain of the water separator can be connected to the cathode off-gas line 32, a water tank, or an off-gas system.

The cathode supply 30 of the fuel cell system 100 shown in FIG. 1 includes a cathode supply path 31 which supplies an oxygen-containing cathode operating resource, in particular air drawn from the environment, to the cathode chambers 13 of the fuel cell stack 10. The cathode supply 30 further comprises a cathode off-gas path 32, which discharges the cathode off-gas (in particular, the exhaust air) from the cathode chambers 13 of the fuel cell stack 10 and, if necessary, feeds it to an off-gas system not shown.

A compressor 33 is arranged in the cathode supply path 31 for conveying and compressing the cathode operating resource. In the implementation example shown, the compressor 33 is designed as a mainly electric-motor-driven compressor 33, which is driven by an electric motor 34 equipped with corresponding power electronics 35.

The fuel cell system 100 shown in FIG. 1 moreover has a humidifier module 39 arranged upstream of the compressor 33 in the cathode supply line 31. On the one hand, the humidifier module 39 is arranged in the cathode supply path 31 so that the cathode off-gas can flow through it. On the other hand, it is arranged in the cathode off-gas path 32 in such a way that the cathode off-gas can flow through it. A humidifier 39 typically has a plurality of water vapor permeable membranes which are either flat or in the form of hollow fibers. The relatively dry cathode operating gas (air) flows over one side of the membranes and the relatively moist cathode off-gas (off-gas) flows over the other side. Driven by the higher partial pressure of water vapor in the cathode off-gas, water vapor is transferred across the membrane into the cathode operating gas, which is humidified in this way.

The fuel cell system 100 moreover has a humidifier bypass 37 connecting together the cathode supply line upstream and downstream of the humidifier 39 with a flap valve arranged therein as a bypass control means 38. Furthermore, flap valves 27.3 and 27.4 are arranged upstream of the fuel cell stack 10 in the anode supply line 31 and downstream of the fuel cell stack 10 in the anode off-gas line 32.

Various other details of the anode and cathode supply lines 20, 30 are not shown in FIG. 1 for reasons of clarity. For example, the anode off-gas line 22 can open into the cathode off-gas line 32, so that the anode off-gas and cathode off-gas are discharged via a common off-gas system.

Figure 2:
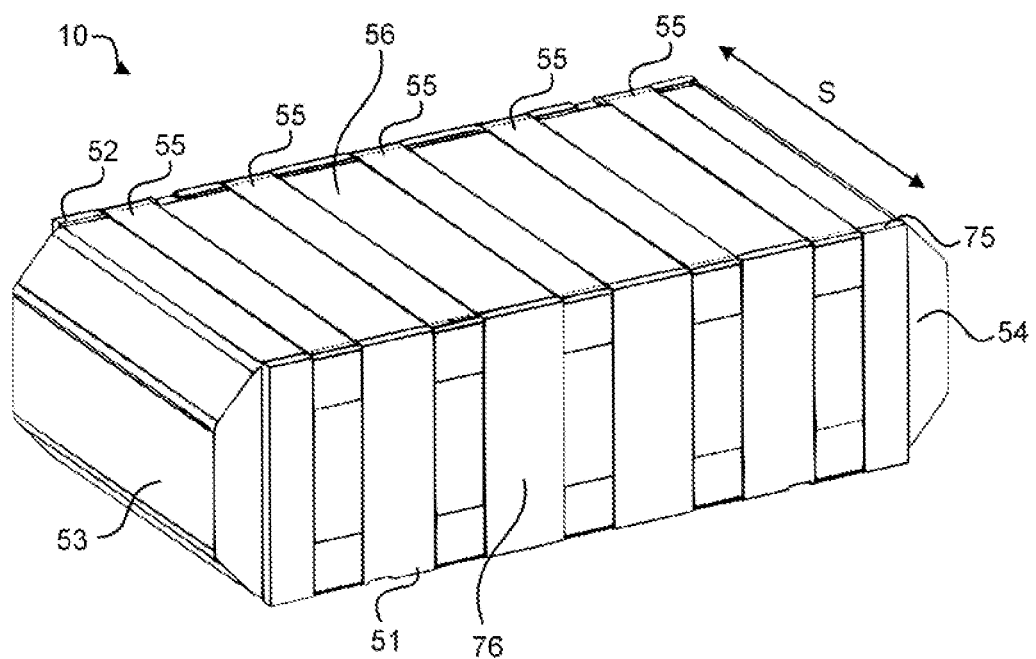
FIG. 2 shows a fuel cell stack with a plurality of tensioning elements compressing the stack.

FIG. 2 shows a detailed representation of a fuel cell stack according to the state of the art, which can be arranged in the fuel cell system 100 of FIG. 1. The fuel cell stack 10 has a plurality of fuel cells stacked flat on top of each other in the stack direction S. In the stack direction, the fuel cell stack 10 is bounded by a first end plate 51 and a thereto opposite second end plate 52. In a first direction that is transverse to the stack direction S, the fuel cell stack 10 is bounded by side panels 53, 54. In a second direction that is transverse to the first direction and transverse to the stack direction S, the fuel cell stack 10 is bounded by side panels 56, 57.

The fuel cell stack 10 shown in FIG. 2 is compressed by a plurality of five tensioning elements 55 total. Each tensioning element 55 completely runs around a cross-section of the fuel cell stack 10, stretching over the end plates 51, 52 and the side panels 56, 57. The tensioning elements 55 thereby rest against the end plates 51, 52 and the side panels 56, 57. Each tensioning element 55 is welded to itself in an area of the upper end plate 51. To compress the fuel cell stack 10, the tensioning elements 55 are welded to themselves while under tensile stress. It is not possible to retension the tensioning elements 55 in the case of the fuel cell stack 10 as shown in FIG. 2.

Figure 3:
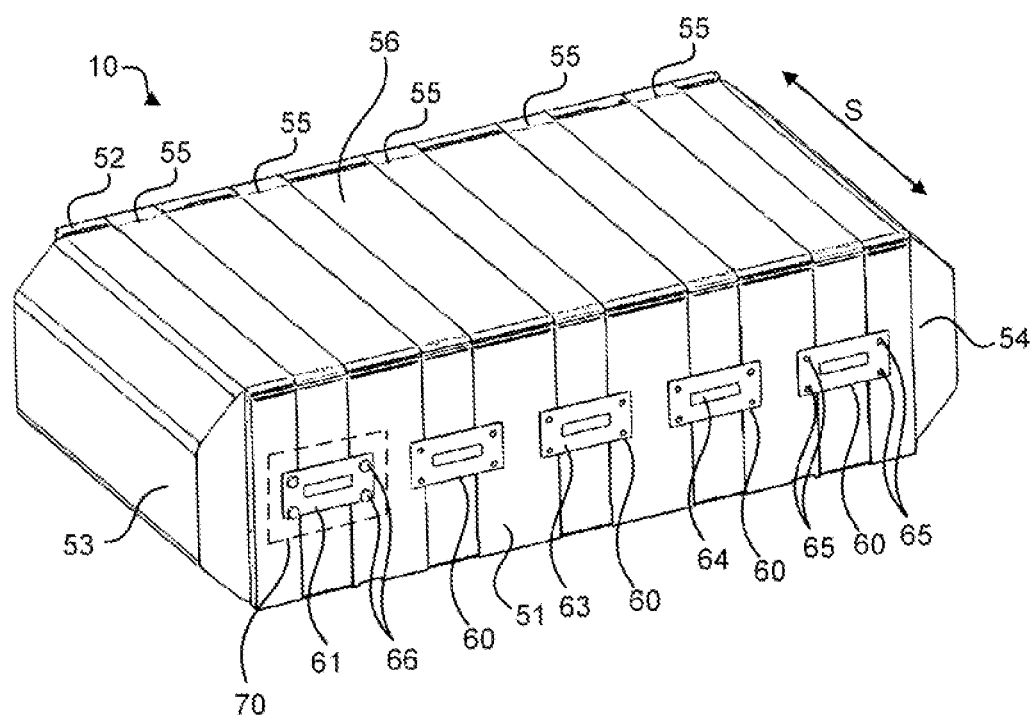
FIG. 3 shows a fuel cell stack with a plurality of tensioning elements compressing the stack and a retensioning element.

FIG. 3 shows a schematic representation of a fuel cell stack 10 according to an embodiment. This differs from the fuel cell stack of FIG. 2 in that each of the five tensioning elements 55 is arranged in corresponding surface sections 70 (shown for one tensioning element only) between the respective surface section 70 and a retensioning element 60. An isolated illustration of such a retensioning element 60 is given in FIG. 5 and its engagement with the fuel cell stack 10 is shown in detail in a cross-sectional view of FIG. 4.

Figure 4:
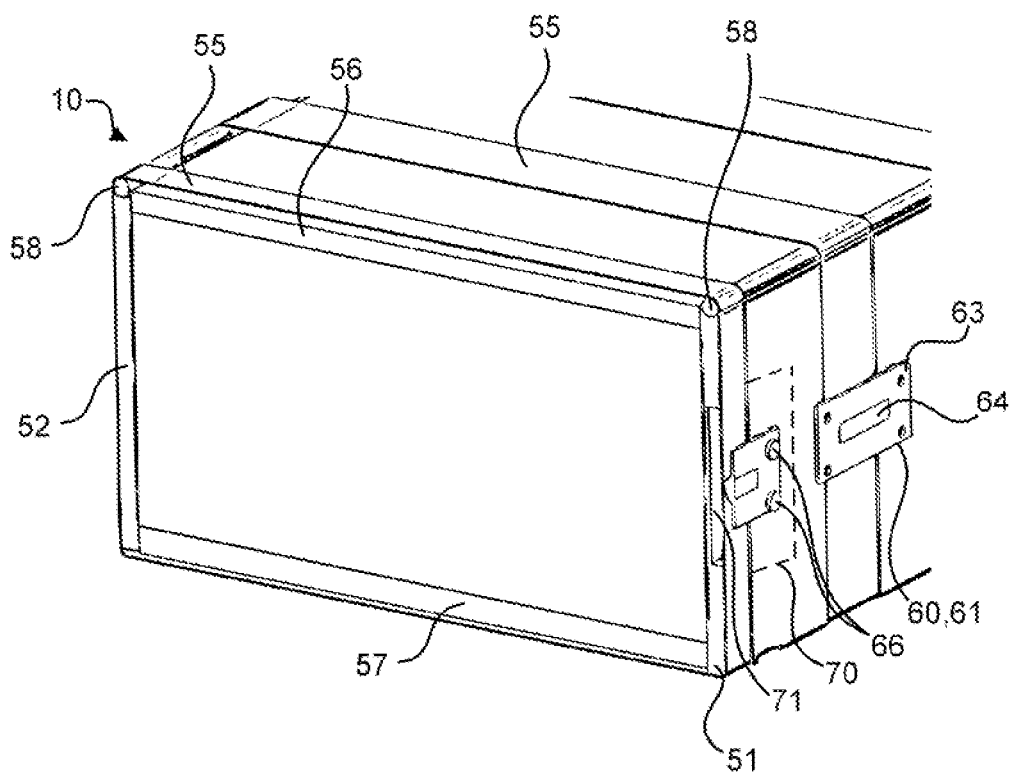
FIG. 4 shows a cross-sectional view of the fuel cell stack of FIG. 3.
Figure 5:
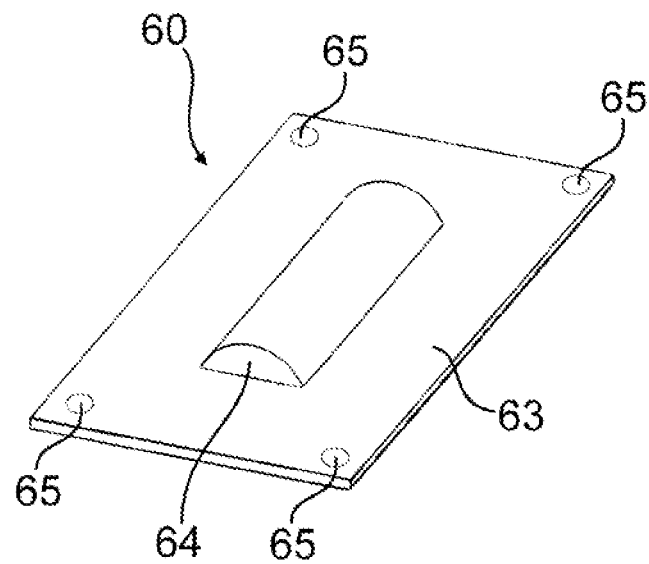
FIG. 5 shows an isolated representation of a retensioning element.

As shown in FIG. 3 and FIG. 4, the retensioning elements 60 are arranged in a central area of the first end plate 51. As shown in FIG. 5, each of the retensioning elements 60 has a tensioning body 61 which consists of a carrier plate 63 and an elevation 64 extending from this plate in the direction of the surface section 70. Openings 65 are provided in the corners of the carrier plate 63. As shown in FIG. 3 and FIG. 4, bolts 66 with external threads or threaded rods 66 pass through the openings 65 and engage with threaded holes (not shown) in surface section 70.

In an initial configuration, the retensioning elements 60 are spaced from the surface section 70 by the adjusting elements 66 in such a way that the elevation 64 does not touch the tensioning element 55. If the adjusting elements 66 are rotationally displaced with a suitable tool, the tensioning body 61 of the retensioning elements 60 is displaced along or against the stack direction S. By rotationally displacing the bolts 66, a distance between the retensioning element 60 and the surface section 70 can thus be reduced.

If the distance between the retensioning elements 60 and the surface section 70 is reduced by rotationally displacing the bolts 66, the elevation 64 of the retensioning element 60 engages with the tensioning element 55, thus lengthening it. In so doing, the tensioning element 55 slides on deflection pulleys 58, which are arranged in an edge area 80, which is tensioned by the tensioning element 55, of the first and second end plates 51, 52. By lengthening of the tensioning element 55, the force exerted by it on the fuel cell stack 10 and the stack compression is increased.

In the area of the retensioning element 60, there is also a recess 71 in the surface section 70 of the end plate 51. By further rotationally displacing the bolts 66, the tensioning element 55 is ultimately pressed from the elevation 64 into the recess 71, as indicated in FIG. 4. The height of the elevation 64 thereby corresponds at most to the depth of the recess 71 in a normal direction of the surface section 70, thus preventing damage to the tensioning element 55 by pressing the tensioning element 55 against the surface section 70.

Figure 6:
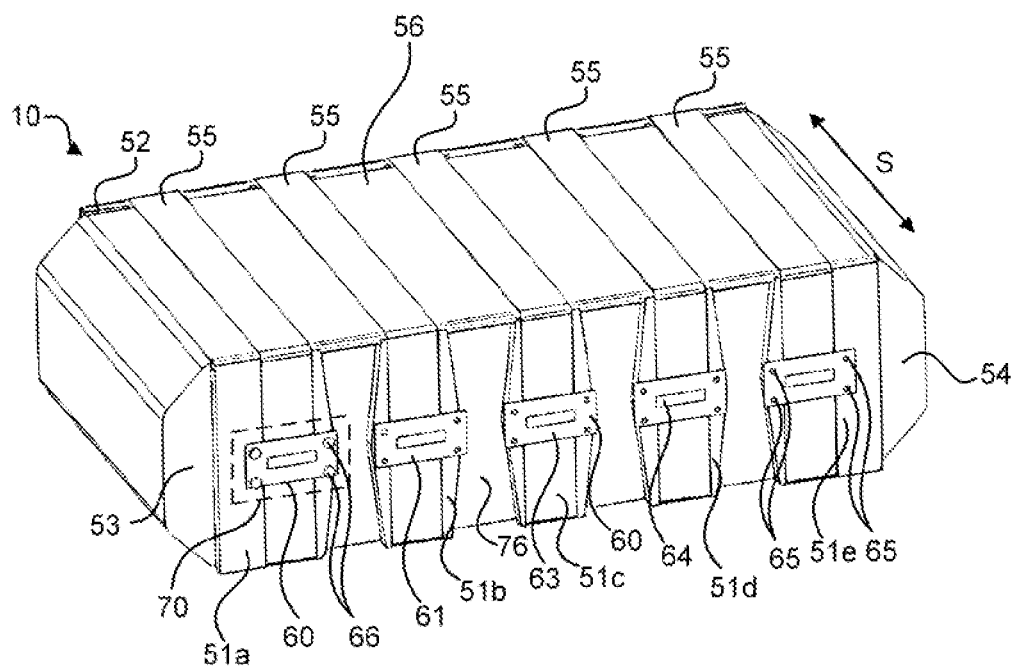
FIG. 6 shows a fuel cell stack with a plurality of tensioning elements compressing the stack and a retensioning element.

A further embodiment is shown in FIG. 6. This differs from the embodiment of FIG. 3 in that the first end plate 51 is segmented. In other words, the first end plate consists of five first end plate segments 51a, 51b, 51c, 51d, 51e. A tensioning element 55 thereby runs over each of the end plate segments 51a, 51b, 51c, 51d, 51e and is arranged in a surface area 70 of the respective end plate segments 51a, 51b, 51c, 51d, 51e between this surface area 70 and a respective retensioning element 60. This allows a local adjustment of the stack compression by lengthening a tensioning element 55 by means of the respective retensioning element 60 and transmission of the force by means of the respective end plate segment 51a, 51b, 51c, 51d, 51e, this largely independent of the remaining end plate segments 51a, 51b, 51c, 51d, 51e. Thus, significant gradients of stack compression tensile force can also be achieved.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell stack, comprising:
   one first end plate and one second end plate;
   a plurality of fuel cells arranged between the first and second end plates;
   at least one elastic tensioning element that is tensioned in a stack direction between the first and second end plates and that either has a closed ring shape or is firmly bonded and/or fixed to at least one of the first and second end plates; and
   a retensioning element,
   wherein the at least one elastic tensioning element is arranged in sections between a surface section of the fuel cell stack and the retensioning element, and
   wherein a distance between the retensioning element and the surface section is variably adjustable to retension the at least one elastic tensioning element.

2. A fuel cell stack according to claim 1, wherein the retensioning element has at least one tensioning body connected to the surface portion via at least one adjusting element.

3. A fuel cell stack according to claim 2, wherein the tensioning body has a carrier plate connected to the at least one adjusting element and at least one elevation projecting from the carrier plate in the direction of the tensioning element.

4. A fuel cell stack according to claim 2, wherein the at least one adjusting element has an external thread engaging in a threaded hole of the surface portion.

5. A fuel cell stack according to claim 3, wherein the carrier plate is attached to the surface portion by a plurality of threaded bolts.

6. A fuel cell stack according to claim 1, wherein the surface portion has at least one recess.

7. A fuel cell stack according to claim 3, wherein the at least one recess is configured to receive the at least one elevation.

8. A cell stack according to claim 1, wherein a deflection device is arranged in at least one edge area tensioned by the at least one tensioning element.

9. A fuel cell stack according to claim 1, wherein the first end plate and/or the second end plate is formed in segments.

10. A vehicle with a fuel cell stack according to claim 1.

* * * * *